(12) United States Patent
Sawanishi et al.

(10) Patent No.: US 12,358,067 B2
(45) Date of Patent: Jul. 15, 2025

(54) RESISTANCE SPOT WELDING METHOD AND WELD MEMBER PRODUCTION METHOD

(71) Applicant: JFE STEEL CORPORATION, Tokyo (JP)

(72) Inventors: Chikaumi Sawanishi, Tokyo (JP); Yasuaki Okita, Tokyo (JP); Hiroshi Matsuda, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 800 days.

(21) Appl. No.: 17/753,141

(22) PCT Filed: Aug. 26, 2020

(86) PCT No.: PCT/JP2020/032240
§ 371 (c)(1),
(2) Date: Feb. 22, 2022

(87) PCT Pub. No.: WO2021/039866
PCT Pub. Date: Mar. 4, 2021

(65) Prior Publication Data
US 2022/0281026 A1 Sep. 8, 2022

(30) Foreign Application Priority Data

Aug. 29, 2019 (JP) ................................. 2019-157192

(51) Int. Cl.
*B23K 11/11* (2006.01)
*B23K 101/18* (2006.01)
(52) U.S. Cl.
CPC ......... *B23K 11/115* (2013.01); *B23K 2101/18* (2018.08)

(58) Field of Classification Search
CPC .............. B23K 11/0026; B23K 11/115; B23K 11/16; B23K 11/166; B23K 2101/006; B23K 2101/18; B23K 2101/34; B23K 2103/04
(Continued)

(56) References Cited

U.S. PATENT DOCUMENTS 4,442,337 A 4/1984 Nakata et al.
5,440,092 A * 8/1995 Kawai .................. B23K 11/256
219/110

(Continued)

FOREIGN PATENT DOCUMENTS

CN 105612020 A 5/2016
CN 107427953 A 12/2017
(Continued)

OTHER PUBLICATIONS

Dec. 29, 2022, Office Action issued by the China National Intellectual Property Administration in the corresponding Chinese Patent Application No. 202080059447.X with English language search report.
(Continued)

*Primary Examiner* — Ibrahime A Abraham
*Assistant Examiner* — Joseph W Iskra
(74) *Attorney, Agent, or Firm* — KENJA IP LAW PC (57) ABSTRACT

Provided is a resistance spot welding method by which a desired nugget diameter can be stably obtained without expulsion even when the effect of a disturbance is significant. An electrode force $F_A$ of a main current passage after an intermediate welding time $T_a$ is set based on an average value or time integration value $R_A$ of a resistance between electrodes from the start of main current passage to the intermediate welding time $T_a$.

2 Claims, 3 Drawing Sheets

(58) Field of Classification Search
USPC .................................................... 219/86.23
See application file for complete search history.

(56) References Cited

U.S. PATENT DOCUMENTS

| | | | |
|---|---|---|---|
| 6,057,523 | A | 5/2000 | Fujii et al. |
| 6,130,396 | A | 10/2000 | Hasegawa et al. |
| 10,081,074 | B2 | 9/2018 | Sawanishi et al. |
| 10,625,365 | B2 | 4/2020 | Sawanishi et al. |
| 10,625,368 | B2 | 4/2020 | Sawanishi et al. |
| 2016/0236294 | A1 | 8/2016 | Sawanishi et al. |
| 2018/0038402 | A1 | 2/2018 | Taniguchi et al. |
| 2018/0281102 | A1 | 10/2018 | Sawanishi et al. |

FOREIGN PATENT DOCUMENTS

| | | | |
|---|---|---|---|
| CN | 107530818 | A | 1/2018 |
| JP | 57127584 | * | 8/1982 |
| JP | S57127584 | A | 8/1982 |
| JP | H09216071 | A | 8/1997 |
| JP | H1094883 | A | 4/1998 |
| JP | H1133743 | A | 2/1999 |
| JP | 2003236674 | A | 8/2003 |
| JP | 2006043731 | A | 2/2006 |
| JP | 2013078806 | A | 5/2013 |
| JP | 2014024119 | A | 2/2014 |
| WO | 2015190082 | A1 | 12/2015 |
| WO | 2016088319 | A1 | 6/2016 |
| WO | 2016147551 | A1 | 9/2016 |

OTHER PUBLICATIONS

Sep. 26, 2022, the Extended European Search Report issued by the European Patent Office in the corresponding European Patent Application No. 20858414.4.

Oct. 20, 2020, International Search Report issued in the International Patent Application No. PCT/JP2020/032240.

* cited by examiner

RESISTANCE SPOT WELDING METHOD AND WELD MEMBER PRODUCTION METHOD

TECHNICAL FIELD

The present disclosure relates to a resistance spot welding method. The present disclosure is particularly intended to stably ensure a desired nugget diameter without expulsion (splash) even in the case where the effect of a disturbance is significant.

BACKGROUND

Overlapping metal sheets, in particular steel sheets are typically joined by resistance spot welding which is one type of lap resistance welding.

Resistance spot welding is a method of squeezing two or more overlapping steel sheets by a pair of electrodes from above and below and, while applying an electrode force, passing a high welding current between the upper and lower electrodes for a short time to join the steel sheets. With this welding method, heat generated from the resistance to the flow of the high welding current is used to form a spot weld. The spot weld is called a nugget, which results from the overlapping steel sheets melting and solidifying at their contact portion when the current flows through the steel sheets. The steel sheets are spot-joined by this nugget.

For good weld quality, it is important to form the nugget with a diameter in an appropriate range. The nugget diameter depends on the welding condition such as welding current, welding time, electrode shape, and electrode force. To achieve an appropriate nugget diameter, the welding condition needs to be set appropriately according to the parts-to-be-welded condition such as the material, sheet thickness, and number of overlapping sheets of the parts to be welded.

In vehicle manufacturing, for example, spot welding is performed at several thousand points per vehicle, and materials to be treated (workpieces) conveyed one after another need to be welded. If the state of the parts to be welded such as the material, sheet thickness, and number of overlapping sheets of the parts to be welded is the same at each welding location, under the same welding condition such as welding current, welding time, and electrode force, the same nugget diameter can be obtained. In continuous welding, however, the contact surfaces of the electrodes with the parts to be welded wear gradually and the contact areas widen gradually as compared with the initial state. When the same welding current as in the initial state is passed in such a state in which the contact areas have widened, the current density in the parts to be welded decreases. Consequently, the temperature rise of the welded portion decreases, resulting in a decrease in nugget diameter. Accordingly, the electrodes are dressed or replaced every several hundred to several thousand welding points, to prevent the electrode tip diameter from increasing excessively.

A resistance welding device having a function (stepper function) of increasing the welding current after a predetermined number of welding operations to compensate for a decrease in current density associated with electrode wear has been conventionally used. To use the stepper function, the above-mentioned welding current change pattern needs to be set appropriately beforehand. However, considerable time and cost are required to derive the welding current change patterns corresponding to numerous welding conditions and parts-to-be-welded conditions through tests and the like. Besides, since the state of progress of electrode wear varies in actual work, the welding current change pattern set beforehand may not always be appropriate.

In addition, in the case where there is a disturbance during welding, such as when a point that has already been welded (existing weld) is present near the current welding point or when the parts to be welded have considerable surface roughness and a contact point of the parts to be welded is present near the welding point, part of the current is shunted into such an existing weld or contact point during welding. In this state, even when welding is performed under a predetermined condition, the current density at the position to be welded which is directly below the electrodes decreases. Therefore, a nugget of a required diameter cannot be obtained. To compensate for such an insufficient amount of heat generated and obtain a nugget of a required diameter, a high welding current needs to be set beforehand.

Moreover, in the case where the surroundings of the welding point are strongly restrained due to surface roughness, member shape, etc. or in the case where foreign matter is present between the steel sheets around the welding point, a gap between the steel sheets is increased. Consequently, a contact diameter of the steel sheets becomes small, which may facilitate expulsion.

The following techniques have been proposed to solve the problems stated above.

For example, JP 2003-236674 A (PTL 1) discloses a spot welding method for high tensile strength steel sheets whereby spot welding is performed through the following steps to suppress expulsion caused by poor fitness in an initial stage of current passage: a first step of gradually increasing the current to high tensile strength steel sheets to form a nugget; a second step of decreasing the current after the first step; and a third step of, after the second step, increasing the current to perform actual welding and gradually decreasing the current.

JP 2006-43731 A (PTL 2) discloses a current control method in spot welding whereby such a current that can suppress spattering is maintained for a predetermined time in an initial part of welding time to soften the surfaces of parts to be welded and then a high current is maintained for a predetermined time to grow a nugget while suppressing spattering.

JP H9-216071 A (PTL 3) discloses a control unit of a resistance welder that compares an estimated temperature distribution of a weld and a target nugget and controls the output of the welder to obtain the set nugget diameter.

JP H10-94883 A (PTL 4) discloses a welding condition control method for a resistance welder of detecting the welding current and the voltage between tips, simulating a weld through heat transfer calculation, and estimating the nugget formation state in the weld during welding to achieve good welding.

JP H11-33743 A (PTL 5) discloses a resistance welding system that calculates, from the sheet thickness of parts to be welded and the welding time, the cumulative amount of heat generated per unit volume with which good welding of the parts to be welded is possible, and adjusts the welding current or voltage to generate the calculated amount of heat per unit volume and per unit time, to achieve good welding regardless of the type of the parts to be welded or the wear state of the electrodes.

CITATION LIST

Patent Literature

PTL 1: JP 2003-236674 A
PTL 2: JP 2006-43731 A

PTL 3: JP H9-216071 A
PTL 4: JP H10-94883 A
PTL 5: JP H11-33743 A

SUMMARY

Technical Problem

However, an appropriate welding condition is likely to vary depending on the presence or absence of a disturbance and the significance of the disturbance. Therefore, with the techniques described in PTL 1 and PTL 2, a desired nugget diameter cannot be ensured without expulsion when a more significant disturbance such as a larger gap between metal sheets as parts to be welded or current shunting than expected occurs.

The techniques described in PTL 3 and PTL 4 need complex calculation to estimate the nugget temperature based on a heat transfer model (heat transfer simulation) and the like, which requires a welding control unit that is complex in structure. In addition, the welding control unit is expensive.

The technique described in PTL 5 enables good welding even with certain electrode wear, by adjusting the cumulative amount of heat generated to a target value.

However, there are cases where the set parts-to-be-welded conditions and the actual parts-to-be-welded conditions differ significantly. For example, if there is a large gap between the metal sheets to be welded, even if the final cumulative amount of heat generated can be matched to the target value, the form of heat generation, that is, the time variation of the temperature distribution in a welded portion, will deviate from the heat amount pattern that can produce a target good welded portion. As a result, the required nugget diameter cannot be obtained, or expulsion occurs.

The present invention has been developed in view of the present situation described above, and it is an object of the present invention to provide a resistance spot welding method by which a desired nugget diameter can be obtained without expulsion even when the effect of a disturbance is significant.

It could also be helpful to provide a weld member production method of joining a plurality of overlapping metal sheets by the resistance spot welding method.

Solution to Problem

We conducted intensive study to achieve the object stated above, and discovered the following:

(1) As described above, if the effect of disturbance is significant, it may not be possible to stably obtain a desired nugget diameter without expulsion.

For example, if the effect of current shunting is significant, sufficient amount of heat generated may not be obtained, resulting in insufficient nugget diameter and nugget thickness.

When the gap between the metal sheets constituting parts to be welded (hereinafter also referred to as "sheet gap") is large, the metal sheets warp greatly when the parts to be welded are applied with excessively high electrode pressure. This may excessively increase the contact area of the metal sheets and the electrodes and promote heat releasing to the electrode, resulting in a smaller nugget diameter and nugget thickness.

Furthermore, when the sheet gap is large, the contact area of the metal sheets constituting the parts to be welded (hereinafter simply referred to as "metal sheets") is small, and thus expulsion is likely to occur.

(2) In order to mitigate the effect of a disturbance such as sheet gap or current shunting, it is effective to set an appropriate electrode force based on the disturbance state (degree of sheet gap or current shunting).

(3) However, in real operation such as vehicle manufacturing, materials to be treated that are conveyed one after another are continuously welded. The disturbance state typically varies among welding positions and materials to be treated, depending on work conditions, dimensional errors of the materials to be treated, and so on. Therefore, it is difficult to accurately grasp the disturbance state of the materials to be treated and to select an optimum electrode force at the time when welding is actually started.

Based on these discoveries and further investigation, we discovered the following:

(4) Whether or not the electrode force set at the start of current passage is appropriate, in other words, the electrode force is sufficient for mitigating the effects of a disturbance can be determined from the average value or time integration value of the resistance between the electrodes until a certain period of time has elapsed since the start of current passage.

(5) Even if the electrode force set at the start of current passage is insufficient for mitigating the effect of a disturbance, it is possible to sufficiently mitigate the effect of a disturbance by setting the electrode force after the certain period of time based on the average value or time integration value of the resistance between the electrodes until the certain period of time has elapsed since the start of current passage.

In detail, the timing for determining whether or not the electrode force set at the start of current passage is appropriate (hereinafter also referred to as "intermediate welding time $T_a$") is optimized, and then the electrode force after the intermediate welding time $T_a$ is set (changed) based on the average value or time integration value of the resistance between the electrodes from the start of current passage to the intermediate welding time $T_a$. By doing so, it is possible to obtain a desired nugget diameter without expulsion, regardless of a disturbance.

The present disclosure is based on these discoveries and further studies.

Primary features of the present disclosure are as follows.

1. A resistance spot welding method of squeezing, by a pair of electrodes, parts to be welded that are a plurality of overlapping metal sheets, and passing a current while applying an electrode force to join the parts to be welded, the resistance spot welding method comprising:

setting an electrode force $F_A$ of main current passage after an intermediate welding time $T_a$ based on an average value or time integration value $R_A$ of a resistance between the electrodes from the start of the main current passage to the intermediate welding time $T_a$, wherein the intermediate welding time $T_a$ satisfies the following formula:

$$0.1 \times T_m \leq T_a \leq 0.8 \times T_m$$

where $T_m$ is a total welding time of the main current passage.

2. The resistance spot welding method according to 1, wherein the electrode force $F_A$ of the main current passage after the intermediate welding time $T_a$ is set so as to satisfy the following formulas (1) to (3):

in the case of $-0.1 \leq (R_A - R_0)/R_0 \leq 0.1$ $$0.9 \times F_0 \leq F_A \leq 1.1 \times F_0 \quad (1)$$

in the case of $(R_A-R_0)/R_0<-0.1$ $$F_0<F_A<F_0\times(1-5.0\times(R_A-R_0)/R_0) \quad (2)$$

in the case of $0.1<(R_A-R_0)/R_0$ $$F_0\times(1-5.0\times(R_A-R_0)/R_0)<F_A<F_0 \quad (3)$$

where
- $F_0$ is an initial set electrode force in the main current passage,
- $R_A$ is the average value or time integration value of the resistance between the electrodes from the start of the main current passage to the intermediate welding time $T_a$, and
- $R_0$ is an average value or time integration value of a resistance between the electrodes from the start of current passage to the intermediate pressurizing time $T_a$ that is obtained in the case where current is passed under the same conditions as the main current passage in a state of no disturbance in the parts to be welded.

3. The resistance spot welding method according to 1, or 2, comprising actual welding in which the main current passage is performed and test welding prior to the actual welding, wherein
in main current passage in the test welding, a time variation curve of an instantaneous amount of heat generated per unit volume and a cumulative amount of heat generated per unit volume that are calculated from an electrical property between the electrodes in forming an appropriate nugget by performing current passage by constant current control, and a time integration value of a resistance between the electrodes are stored, and
further, in the main current passage in the actual welding, the time variation curve of the instantaneous amount of heat generated per unit volume and the cumulative amount of heat generated per unit volume in the main current passage in the test welding are set as target values, and adaptive control welding is performed to control a current passage amount according to the target values.

4. A weld member production method comprising joining a plurality of overlapping metal sheets by the resistance spot welding method according to any one of 1 to 3.

Advantageous Effect

It is thus possible to stably obtain a desired nugget diameter without expulsion, regardless of the effect of a disturbance.

It is also possible to stably ensure a desired nugget diameter by effectively responding to variations in the disturbance state, even when continuously welding materials to be treated which are conveyed one after another in real operation such as vehicle manufacturing (even when the disturbance state varies among welding positions or the materials to be treated). This is very advantageous in improving operating efficiency and yield rate.

DETAILED DESCRIPTION

The presently disclosed techniques will be described below by way of embodiments.

One of the disclosed embodiments relates to a resistance spot welding method of squeezing, by a pair of electrodes, parts to be welded which are a plurality of overlapping metal sheets, and passing a current while applying an electrode force to join the parts to be welded, the resistance spot welding method comprising
setting an electrode force $F_A$ of main current passage after an intermediate welding time $T_a$ based on an average value or time integration value $R_A$ of a resistance between the electrodes from the start of the main current passage to the intermediate welding time $T_a$.

Any welding device that includes a pair of upper and lower electrodes and is capable of freely controlling each of the electrode force and the welding current during welding may be used in the resistance spot welding method according to one of the disclosed embodiments. The type (stationary, robot gun, etc.), the electrode shape, and the like are not limited.

The resistance spot welding method according to one of the disclosed embodiments will be described below.

(A) Main current passage (in order to distinguish from the main current passage in the test welding as described below, also referred to as main current passage in the actual welding. When simply referring to "main current passage", it means the main current passage in the actual welding, not main current passage in the test welding. The "main current passage" means current passage for nugget formation. The "actual welding" means the process of actually welding intended parts to be welded and is used to distinguish it from the test welding as described below).

As described above, in order to mitigate the effects of a disturbance such as sheet gap or current shunting, it is effective to set the appropriate electrode force depending on the disturbance state (size of sheet gap or degree of current shunting). However, it is difficult to accurately grasp the disturbance state of the materials to be treated and to select an electrode force appropriate for the disturbance state at the time when welding is actually started.

Therefore, in the resistance spot welding method of one of the disclosed embodiments, in performing main current passage to form a nugget, it is important to start current passage with a predetermined electrode force and to set the electrode force in the main current passage after the intermediate welding time $T_a$ based on the average value or time integration value of the resistance between the electrodes from the start of the current passage to the intermediate welding time $T_a$.

For example, it is suitable to set the electrode force $F_A$ of the main current passage after the intermediate welding time $T_a$ so as to satisfy the following formulas (1) to (3):

in the case of $-0.1 \leq (R_A-R_0)/R_0 \leq 0.1$ $$0.9 \times F_0 \leq F_A \leq 1.1 \times F_0 \quad (1)$$

in the case of $(R_A-R_0)/R_0 < -0.1$ $$F_0 < F_A < F_0 \times (1-5.0 \times (R_A-R_0)/R_0) \quad (2)$$

in the case of $0.1 < (R_A-R_0)/R_0$ $$F_0 \times (1-5.0 \times (R_A-R_0)/R_0) < F_A < F_0 \quad (3)$$

where
- $F_0$ is an initial set electrode force in the main current passage,
- $R_A$ is the average value or time integration value of the resistance between the electrodes from the start of the main current passage to the intermediate welding time $T_a$, and
- $R_0$ is an average value or time integration value of a resistance between the electrodes from the start of current passage to the intermediate pressurizing time $T_a$ that is obtained in the case where current is passed under the same conditions as the main current passage in a state of no disturbance in the parts to be welded.

When $R_A$ is the average value of the resistance between the electrodes from the start of the main current passage to the intermediate welding time $T_a$, $R_0$ is also the average value of the resistance between the electrodes from the start of current passage to the intermediate pressurizing time $T_a$ that is obtained in the case where current is passed under the same conditions as the main current passage in a state of no disturbance in the parts to be welded. Similarly, when $R_A$ is the time integration value of the resistance between the electrodes from the start of the main current passage to the intermediate welding time $T_a$, $R_0$ is also the time integration value of the resistance between the electrodes from the start of current passage to the intermediate pressurizing time $T_a$ that is obtained in the case where current is passed under the same conditions as the main current passage in a state of no disturbance in the parts to be welded.

Here, when $(R_A-R_0)/R_0$ is negative (in particular, less than $-0.1$), that is, when $R_A$ is a certain amount smaller than $R_0$, for example, it is considered to be in the following state.

In detail, because the contact area of the steel sheets is not sufficiently secured due to the effect of a sheet gap, nuggets grow rapidly in the early stage of current passage to rapidly expand the current conducting area. As a result, $R_A$ becomes smaller than $R_0$, and it is considered that expulsion is likely to occur when the electrode force is kept constant.

Alternatively, it is considered that the resistance between the electrodes is reduced by the effect of current shunting, and the nugget diameter or thickness is easily reduced.

In such a state, it is effective to increase the electrode force $F_A$ of the main current passage after the intermediate welding time $T_a$ to a value higher than the initial set electrode force $F_0$ in the main current, in particular, to set the electrode force $F_A$ to a value satisfying the above formula (2).

On the other hand, when $(R_A-R_0)/R_0$ is positive (especially, more than 0.1), that is, when $R_A$ is a certain amount larger than $R_0$, for example, it is considered to be in the following state.

In detail, it is considered that the surface resistance increases due to the alloying of the electrodes with Zn or Fe in the continuous spot welding of a sheet combination having a Zn alloy coated steel sheet on its outer side, while the current density decreases due to the increase in the contact area of the electrodes and the steel sheets, and the nugget diameter is easily reduced.

In such a state, the current path is less expanded during welding and $R_A$ is larger than $R_0$. For this reason, it is effective to decrease the electrode force $F_A$ of the main current passage after the intermediate welding time $T_a$ to a value lower than the initial set electrode force $F_0$ in the main current passage, in particular, to set the electrode force $F_A$ to a value satisfying the above formula (3).

However, in the case of $-0.1 \leq (R_A-R_0)/R_0 \leq 0.1$, the effect of a disturbance is not so great, and the electrode force $F_A$ of the main current passage after the intermediate welding time $T_a$ should be set to a value satisfying the above formula (1).

Thus, based on the average value or time integration value $R_A$ of the resistance between the electrodes from the start of the main current passage to the intermediate welding time $T_a$, various changes in the electrode force $F_A$ of the main current passage after the intermediate welding time $T_a$, in particular, satisfying the above formulas (1) to (3), is effective to obtain a desired nugget diameter without expulsion, regardless of a disturbance.

It is more preferable that the above formulas (1) to (3) be the following formulas (1)' to (3)', respectively.

in the case of $-0.1 \leq (R_A-R_0)/R_0 \leq 0.1$ $$0.95 \times F_0 \leq F_A \leq 1.05 \times F_0 \quad (1)'$$

in the case of $(R_A-R_0)/R_0 < -0.1$ $$1.05 \times F_0 < F_A < F_0 \times (1-5.0 \times (R_A-R_0)/R_0) \quad (2)'$$

in the case of $0.1 < (R_A-R_0)/R_0$ $$F_0 \times (1-5.0 \times (R_A-R_0)/R_0) < F_A < 0.95 \times F_0 \quad (3)'$$

(where with respect to the lower limits of the above formulas (3) and (3)', if $F_0 \times (1-5.0 \times (R_A-R_0)/R_0)$ is less than or equal to $F_0 \times 0.1$, the lower limits of the formulas are $F_0 \times 0.1$.)

The initial set electrode force $F_0$ in the main current passage may be set appropriately based on the material property and thickness of the metal sheets constituting the parts to be welded.

For example, if a typical sheet combination of two sheets is used, the initial set electrode force is preferably set to 1.0 kN or more. The initial set electrode force is preferably set to 7.0 kN or less.

In addition, when a sheet combination of three or more sheets (e.g., a sheet combination of three steel sheets (so-called mild steel with a thickness of 0.5 mm to 3.0 mm, or 490 MPa to 2000 MPa-class Zn alloy coated steel sheets or uncoated steel sheets) of the same sheet thickness, or a sheet combination of two thick sheets (so-called mild steel with a thickness of 0.8 mm to 3.0 mm, or 490 MPa to 2000 MPa-class Zn alloy coated steel sheets or uncoated steel sheets) and one thin sheet (Zn alloy coated steel sheet or uncoated steel sheet (mild steel) with a thickness of 0.5 mm to 2.0 mm) is used, the initial set electrode force is preferably set to 2.0 kN or more. The initial set electrode force is preferably set to 10.0 kN or less.

When the test welding as described below is performed, the electrode force in the main current passage of the test welding may be used as the initial set electrode force $F_0$ in the main current passage of the actual welding.

The average value or time integration value $R_0$ of the resistance between the electrodes from the start of current passage to the intermediate pressurizing time $T_a$ that is obtained in the case where current is passed under the same conditions as the main current passage in a state of no disturbance in the parts to be welded, may be determined, for example, by separately preparing parts to be welded consisting of metal sheets of the same sheet thickness and material property as in the main current passage and having no disturbance, and performing a preliminary welding test to weld the parts to be welded under the same conditions as the main current passage.

When the test welding as described below is performed, the average value or time integration value of a resistance between the electrodes from the start of the main current passage to the intermediate pressurizing time $T_a$ in the test welding may be used as $R_0$.

The intermediate welding time $T_a$ (ms) is set so as to satisfy $$0.1 \times T_m \leq T_a \leq 0.8 \times T_m$$

by using the total welding time $T_m$ (ms) of the main current passage.

When the intermediate welding time $T_a$ (ms) is less than $0.1 \times T_m$, it is difficult to accurately grasp the disturbance state of a material to be treated and to set an appropriate electrode force. On the other hand, when the intermediate welding time $T_a$ (ms) exceeds $0.8 \times T_m$, recovery from the effect of a disturbance is difficult in the case that the electrode force set at the start of current passage is not sufficient to mitigate the effect of the disturbance.

Therefore, the intermediate welding time $T_a$ (ms) is set so as to satisfy $$0.1 \times T_m \leq T_a \leq 0.8 \times T_m$$

by using the total welding time $T_m$ (ms) of the main current passage.

The intermediate welding time $T_a$ (ms) is preferably not less than $0.15 \times T_m$ and more preferably not less than $0.2 \times T_m$. The intermediate welding time $T_a$ (ms) is preferably not greater than $0.7 \times T_m$, and more preferably not greater than $0.6 \times T_m$.

Furthermore, the main current passage may be performed by constant current control or by performing the test welding as described below before adaptive control welding in which current passage amount is controlled according to target values set in the test welding.

In the case of constant current control, the welding current and welding time may be set appropriately based on the material property and thickness of the metal sheets constituting the parts to be welded.

For example, when a typical sheet combination of two sheets is used, the current value is preferably set to 4.0 kA or more. The current value is preferably set to 12.0 kA or less. The welding time is preferably set to 80 ms or more. The welding time is preferably set to 800 ms or less.

When the sheet combination of three or more sheets as described above is used, the current value is preferably set to 4.0 kA or more. The current value is preferably set to 12.0 kA or less. The welding time is preferably set to 120 ms or more. The welding time is preferably set to 1000 ms or less.

In addition, the main current passage may be divided into two or more steps, and constant current control may be performed for each step. In this case, the current value for each step may be different. An cooling time may be provided between the steps. In the case where a cooling time is provided between the steps of the main current passage, the total welding time of the main current passage includes the cooling time.

In the case of adaptive control welding, welding is performed based on target values obtained by the test welding as described below (time variation curve of the instantaneous amount of heat generated and cumulative amount of heat generated per unit volume). If the amount of time variation of the instantaneous amount of heat generated per unit volume follows the time variation curve as a standard, the welding is continued without change and completed. If the amount of time variation of the instantaneous amount of heat generated per unit volume differs from the time variation curve as a standard, the current passage amount is controlled in order to compensate for the difference within a remaining welding time so that the cumulative amount of heat generated per unit volume in the actual welding matches the cumulative amount of heat generated per unit volume set as the target value.

Furthermore, the main current passage may be divided into two or more steps, and adaptive control welding may be performed for each step.

In detail, the main current passage in the actual welding and the main current passage in the test welding as described below are divided into two or more steps so as to correspond to each other.

Then, welding is performed based on the target values (time variation curve of instantaneous amount of heat generated and cumulative amount of heat generated per unit volume) for each step obtained by the test welding. In each step, if the amount of time variation of the instantaneous amount of heat generated per unit volume in the step differs from the time variation curve as a standard, the current passage amount is controlled in order to compensate for the difference within a remaining welding time in the step so that the cumulative amount of heat generated per unit volume in the step matches the cumulative amount of heat generated per unit volume in the step in the test welding.

A method of calculating the amount of heat generated is not limited. PTL 5 describes an example of the method, which may be used herein. The following is the procedure of calculating the amount q of heat generated per unit volume and per unit time and the cumulative amount Q of heat generated per unit volume according to this method.

Let t be the total thickness of the parts to be welded, r be the electrical resistivity of the parts to be welded, V be the voltage between the electrodes, I be the welding current, and S be the contact area of the electrodes and the parts to be welded. In this case, the welding current passes through a columnar portion whose cross-sectional area is S and thickness is t, to generate heat by resistance. The amount q of heat generated per unit volume and per unit time in the columnar portion is given by the following formula (4):

$$q = (V \cdot I)/(S \cdot t) \qquad (4).$$

The electrical resistance R of the columnar portion is given by the following formula (5):

$$R = (r \cdot t)/S \qquad (5).$$

Solving the formula (5) for S and substituting the solution into the formula (4) yields the amount q of heat generated as indicated by the following formula (6):

$$q = (V \cdot I \cdot R)/(r \cdot t^2) \qquad (6)$$
$$= (V^2)/(r \cdot t^2).$$

As is clear from the above formula (6), the amount q of heat generated per unit volume and per unit time can be calculated from the voltage V between the electrodes, the total thickness t of the parts to be welded, and the electrical resistivity r of the parts to be welded, and is not affected by the contact area S of the electrodes and the parts to be welded. Although the amount of heat generated is calculated from the voltage V between the electrodes in the formula (6), the amount q of heat generated may be calculated from the current I between the electrodes. The contact area S of the electrodes and the parts to be welded need not be used in this case, either. Accumulating the amount of heat generated q per unit volume and unit time over the entire welding time period yields the cumulative amount of heat generated Q per unit volume that is added during welding. As is clear from the formula (6), this cumulative amount of heat generated Q per unit volume can also be calculated without using the area S of contact between the electrodes and the parts to be welded.

Although the above describes the case of calculating the cumulative amount Q of heat generated by the method described in PTL 5, the cumulative amount Q may be calculated by any other method.

(B) Test Welding

When the main current passage of the above actual welding is performed by adaptive control welding, a test welding is performed prior to the actual welding. In the main current passage in the test welding, the time variation curve of an instantaneous amount of heat generated per unit volume and the cumulative amount of heat generated per unit volume that are calculated from the electrical property between the electrodes in forming an appropriate nugget by performing current passage by constant current control are stored.

In detail, in the test welding, a preliminary welding test with the same steel type and thickness as the parts to be welded used in the actual welding is performed by constant current control under various conditions in the state where there is no current shunting to an existing weld or sheet gap, to find an optimal condition in the test welding.

The current passage is then performed under the optimal condition, and the time variation curve of an instantaneous amount of heat generated per unit volume and the cumulative amount of heat generated per unit volume that are calculated from the electrical property between the electrodes in the current passage are stored as target values in the actual welding. Herein, the "electrical property between the electrodes" means the resistance between the electrodes or the voltage between the electrodes.

As described above, the main current passage in the test welding may be divided into two or more steps, and adaptive control welding for each step may be performed in the actual welding.

(C) Other Conditions

Prior to the main current passage for nugget formation (main current passage in the actual welding and/or test welding), preliminary current passage may be performed to stabilize the contact diameter, or subsequent current passage may be performed for post heat treatment. These preliminary current passage and subsequent current passage may be performed by constant current control or as a current pattern of an upslope or downslope.

Further, a cooling time may be provided between the preliminary current passage and the main current passage, and between the main current passage and the subsequent current passage, respectively.

The parts to be welded that are used are not limited. The resistance spot welding method may be used for welding of steel sheets and coated steel sheets having various strengths from mild steel to ultra high tensile strength steel sheets and light metal sheets of aluminum alloys and the like. The resistance spot welding method may also be used for a sheet combination of three or more steel sheets.

By joining a plurality of overlapping metal sheets by the resistance spot welding method described above, various weld members, in particular weld members of automotive parts and the like, can be produced while stably ensuring a desired nugget diameter by effectively responding to variations in the disturbance state.

EXAMPLES

Hereinafter, examples of the disclosure will be described. The conditions in the examples are one example of conditions employed to confirm the operability and effects of the presently disclosed techniques, and the present disclosure is not limited to such example of conditions. Various conditions can be used in the present disclosure as long as the object of the present disclosure is fulfilled, without departing from the scope of the present disclosure.

For the sheet combinations listed in Table 1, welded joints were fabricated by performing actual welding (main current passage) under the conditions listed in Table 2 in the states illustrated in FIGS. 1A and 1B to 3A and 3B.

Figure 2A:
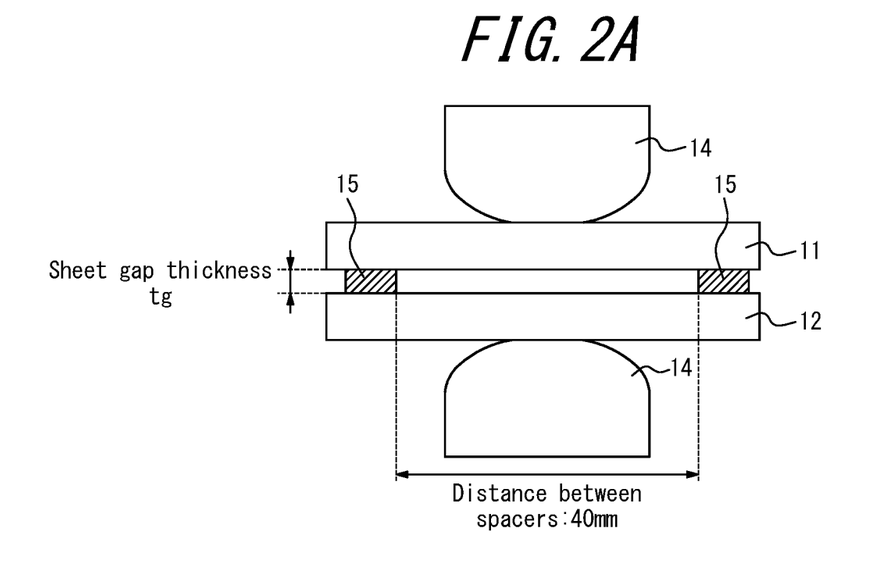
FIG. 2A is a diagram schematically illustrating an example of a case of welding a sheet combination having a sheet gap.
Figure 2B:
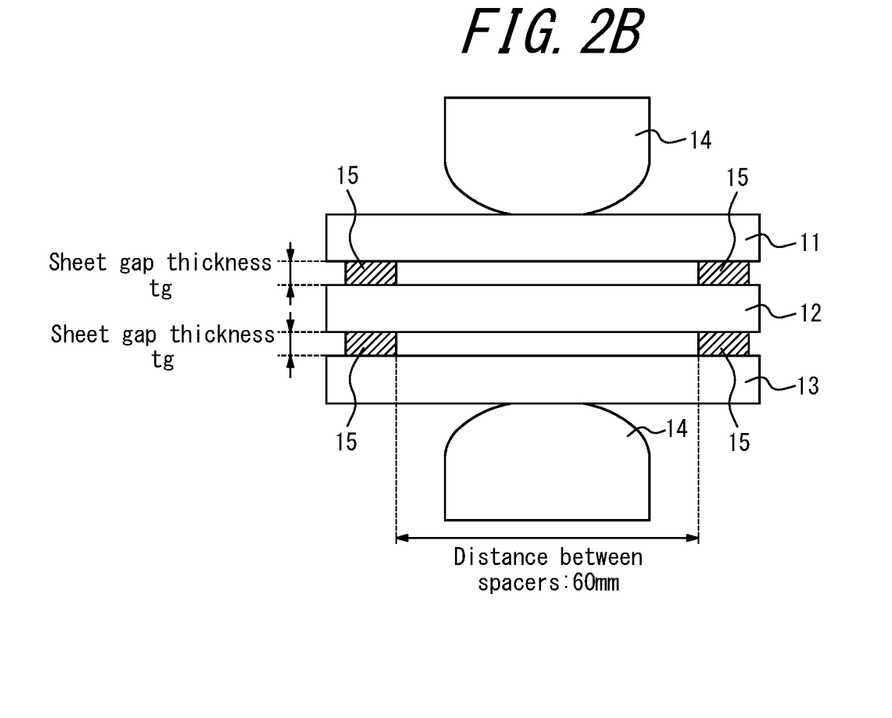
FIG. 2B is a diagram schematically illustrating an example of a case of welding a sheet combination having a sheet gap.

In FIGS. 2A and 2B, sheet gaps of various thicknesses are provided by inserting spacers 15 between the metal sheets and clamping them from above and below (not shown) (in the case of a sheet combination of three sheets, the thickness tg of the sheet gap between metal sheets 11 and 12 is the same value as the thickness tg of the sheet gap between metal sheets 12 and 13). The distance between the spacers was 40 mm for a sheet combination of two sheets and 60 mm for a sheet combination of three sheets.

Figure 3A:
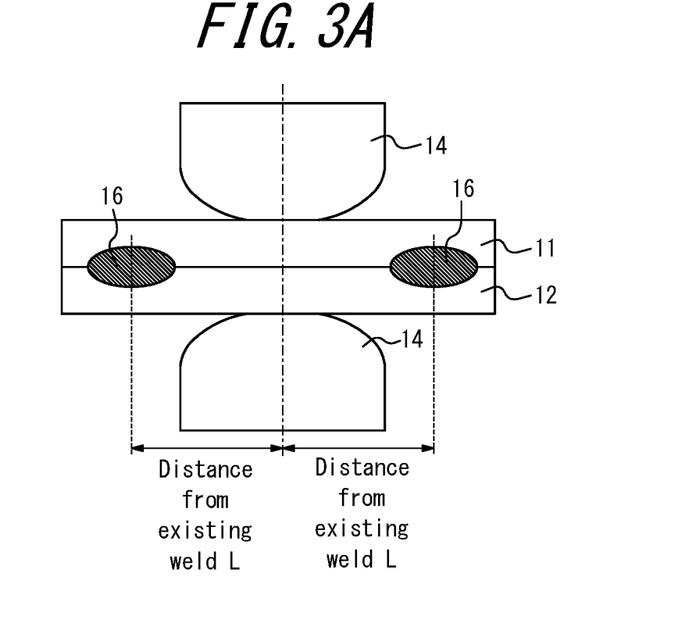
FIG. 3A is a diagram schematically illustrating an example of a case of welding a sheet combination having an existing weld.
Figure 3B:
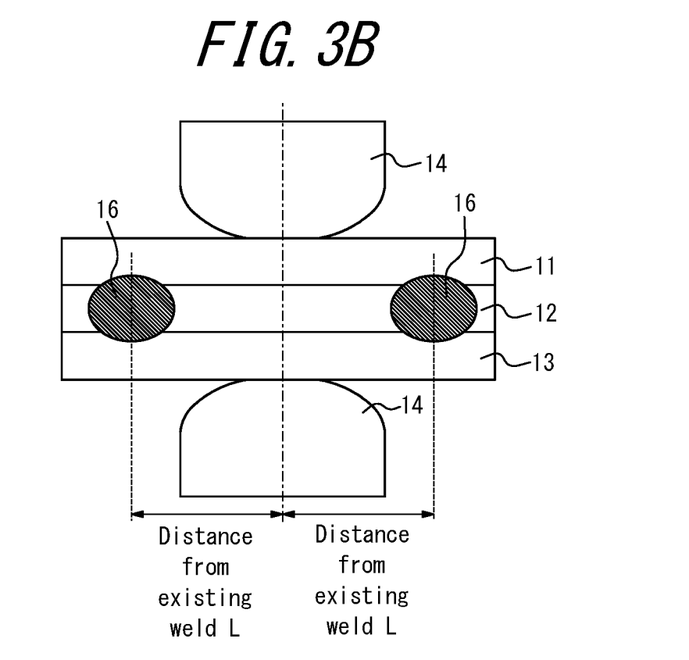
FIG. 3B is a diagram schematically illustrating an example of a case of welding a sheet combination having an existing weld.

In FIGS. 3A and 3B, two existing welds 16 are provided, and the welding position (the center between the electrodes 14) was adjusted to be at a midpoint between the existing welds (i.e., the same distance L from each existing weld). The nugget diameter at the existing weld was set to $4\sqrt{t'}$ ($t'$ is the sheet thickness (mm) of the thinnest metal sheet in the sheet combination).

In No. 10-2, in order to simulate the state of alloying of an electrode with Zn (which occurs when continuous spot welding is performed on a sheet combination having a Zn alloy coated steel sheet on its outer side), resistance spot welding was performed at 1000 points on a separately prepared sheet combination having a Zn alloy coated steel sheet on its outer side. Then, the electrodes used for the resistance spot welding at the 1000 points were used for the actual welding.

Figure 1A:
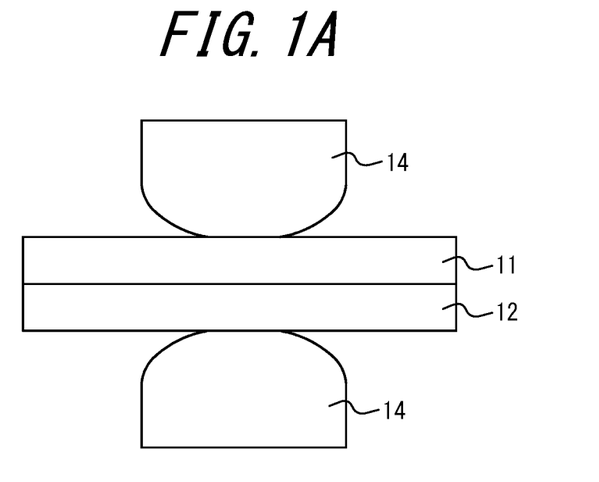
FIG. 1A is a diagram schematically illustrating an example of the case of performing welding without a disturbance.
Figure 1B:
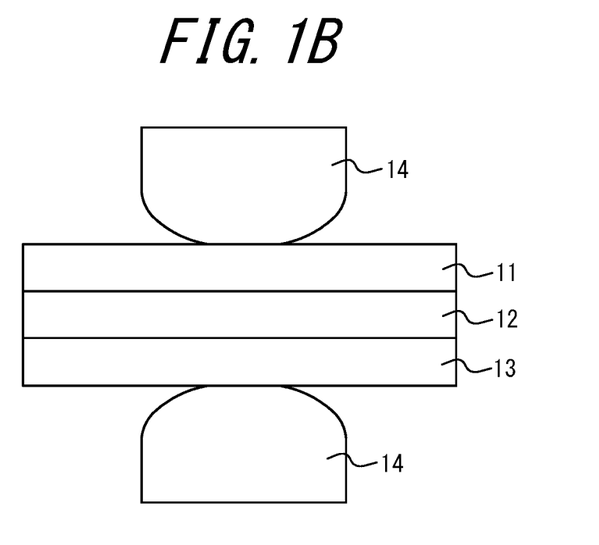
FIG. 1B is a diagram schematically illustrating an example of the case of performing welding without a disturbance.

For some of the examples, before the actual welding, test welding was performed under the conditions listed in Table 2 in a state without any disturbance as illustrated in FIGS. 1A and 1B to store the time variation curve of the instantaneous amount of heat generated per unit volume and the cumulative amount of heat generated per unit volume in the main current passage of the test welding. The average value of a resistance between the electrodes from the start of the main current passage to the intermediate pressurizing time $T_a$ in the test welding was measured, and this measured value was set as $R_0$.

When current passage was performed by constant current control, parts to be welded without any disturbance consisting of metal sheets of the same thickness and material property as that used in the main current passage were separately prepared and subjected to a preliminary welding test in which the parts to be welded were welded under the same conditions as the actual welding to determine $R_0$.

The values of $R_0$ obtained as described above are listed in Table 2.

For each of the fabricated welded joints, the welded portion was cut and the cross section thereof was etched, then observed under an optical microscopy, and evaluated in the following three levels based on the nugget diameter and the presence or absence of expulsion. For a sheet combination of three sheets, evaluation was conducted based on the diameter of a nugget (nugget diameter) between the thinnest outer metal sheet 11 and the metal sheet 12 adjacent to it.

A: Regardless of a disturbance, the nugget diameter is 5√t' or more (t' is the sheet thickness (mm) of the thinnest metal sheet in the sheet combination) and no expulsion occurred B: Regardless of a disturbance, the nugget diameter is 4.5√t' or more and no expulsion occurred (except in case of A)

C: Regardless of a disturbance, the nugget diameter is 4√t' or more and no expulsion occurred (except for cases A and B)

F: Depending on a disturbance, the nugget diameter is less than 4√t' or expulsion occurred

TABLE 1

| Sheet combination No. | Metal sheet of sign 11 in figures | Metal sheet of sign 12 in figures | Metal sheet of sign 13 in figures | 4√t' | 4.5√t' | 5√t' |
|---|---|---|---|---|---|---|
| A | 270 MPa-class cold rolled steel sheet (sheet thickness of 1.6 mm) | 270 MPa-class cold rolled steel sheet (sheet thickness of 1.6 mm) | | 5.06 | 5.69 | 6.32 |
| B | 270 MPa-class cold rolled steel sheet (sheet thickness of 0.7 mm) | 1470 MPa-class cold rolled steel sheet (sheet thickness of 1.6 mm) | 1470 MPa-class cold rolled steel sheet (sheet thickness of 1.6 mm) | 3.35 | 3.76 | 4.18 |
| C | 1470 MPa-class cold rolled steel sheet (sheet thickness of 1.6 mm) | 1470 MPa-class cold rolled steel sheet (sheet thickness of 1.6 mm) | | 5.06 | 5.69 | 6.32 |
| D | 270 MPa-class GA steel sheet (sheet thickness of 1.6 mm) | 270 MPa-class GA steel sheet (sheet thickness of 1.6 mm) | | 5.06 | 5.69 | 6.32 |
| E | 270 MPa-class GA steel sheet (sheet thickness of 0.7 mm) | 980 MPa-class cold rolled steel sheet (sheet thickness of 1.2 mm) | 1470 MPa-class GA steel sheet (sheet thickness of 1.4 mm) | 3.35 | 3.76 | 4.18 |

TABLE 2

| | | Test welding condition | | | Actual welding condition | | | | | | | | |
|---|---|---|---|---|---|---|---|---|---|---|---|---|---|
| No. | Sheet combination No. | Set electrode force (kN) | Current value (kA) | Welding time (ms) | Disturbance state | Current passage method | Change of electrode force | $R_0$ (μΩ) | $R_A$ (μΩ) | $(R_A-R_0)/R_0$ | Appropriate range of $F_A/F_0$ according to formula (1)~(3)* | | Remarks |
| 1 | 1-1 | A | 3.5 | 9.0 | 320 | absent | adaptive control | present | 180 | 178 | −0.01 | 0.9~1.1 | formula (1) | Example |
| | 1-2 | | | | | existing weld (L = 20 mm) | | | | 155 | −0.14 | 1.00~1.69 | formula (2) | |
| | 1-3 | | | | | existing weld (L = 10 mm) | | | | 120 | −0.33 | 1.00~2.67 | formula (2) | |
| 2 | 2-1 | B | 5.0 | 7.5 | 400 | absent | adaptive control | present | 230 | 231 | 0.00 | 0.9~1.1 | formula (1) | Example |
| | 2-2 | | | | | existing weld (L = 20 mm) | | | | 221 | −0.04 | 0.9~1.1 | formula (1) | |
| | 2-3 | | | | | existing weld (L = 10 mm) | | | | 200 | −0.13 | 1.00~1.65 | formula (2) | |
| 3 | 3-1 | C | 4.0 | 7.0 | 320 | absent | adaptive control | present | 200 | 196 | −0.02 | 0.9~1.1 | formula (1) | Example |
| | 3-2 | | | | | sheet gap (tg = 1 mm) | | | | 174 | −0.13 | 1.00~1.65 | formula (2) | |
| | 3-3 | | | | | sheet gap (tg = 2 mm) | | | | 165 | −0.18 | 1.00~1.88 | formula (2) | |
| 4 | 4-1 | C | — | | | absent | constant current control | present | 200 | 199 | −0.01 | 0.9~1.1 | formula (1) | Example |
| | 4-2 | | | | | sheet gap (tg = 1 mm) | | | | 179 | −0.11 | 1.00~1.53 | formula (2) | |
| | 4-3 | | | | | sheet gap (tg = 2 mm) | | | | 167 | −0.17 | 1.00~1.83 | formula (2) | |
| 5 | 5-1 | C | — | | | absent | constant current control | present | 200 | 202 | 0.01 | 0.9~1.1 | formula (1) | Example |
| | 5-2 | | | | | sheet gap (tg = 1 mm) | | | | 178 | −0.11 | 1.00~1.55 | formula (2) | |
| | 5-3 | | | | | sheet gap (tg = 2 mm) | | | | 165 | −0.18 | 1.00~1.88 | formula (2) | |
| 6 | 6-1 | A | 3.5 | 9.0 | 320 | absent | adaptive control | *absent* | — | — | — | — | | Comparative example |
| | 6-2 | | | | | existing weld (L = 20 mm) | | | | | | | | |
| | 6-3 | | | | | existing weld (L = 10 mm) | | | | | | | | |

TABLE 2-continued

| No. | Sheet combination No. | Initial set electrode force $F_0$ (kN) | Electrode force $F_A$ after $T_a$ (kN) | $F_A/F_0$ | Current value (kA) | Welding time $T_m$ (ms) | Intermediate welding time $T_a$ (ms) | $T_a/T_m$ | Nugget diameter (mm) | Expulsion | Evaluation | Remarks |
|---|---|---|---|---|---|---|---|---|---|---|---|---|
| 1 | 1-1 | A | 3.5 | 3.5 | 1.00 | — | 320 | 100 | 0.31 | 6.4 | absent | A | Example |
|  | 1-2 |  |  | 3.9 | 1.11 |  |  |  |  | 6.6 | absent |  |  |
|  | 1-3 |  |  | 4.7 | 1.34 |  |  |  |  | 6.5 | absent |  |  |
| 2 | 2-1 | B | 5.0 | 4.9 | 0.98 | — | 400 | 140 | 0.35 | 4.4 | absent | A | Example |
|  | 2-2 |  |  | 5.2 | 1.04 |  |  |  |  | 4.6 | absent |  |  |
|  | 2-3 |  |  | 5.8 | 1.16 |  |  |  |  | 4.3 | absent |  |  |
| 3 | 3-1 | C | 4.0 | 4.0 | 1.00 | — | 320 | 120 | 0.38 | 6.4 | absent | A | Example |
|  | 3-2 |  |  | 5.2 | 1.30 |  |  |  |  | 6.5 | absent |  |  |
|  | 3-3 |  |  | 6.1 | 1.53 |  |  |  |  | 6.6 | absent |  |  |
| 4 | 4-1 | C | 4.0 | 4.0 | 1.00 | 7.0 | 320 | 120 | 0.38 | 6.6 | absent | B | Example |
|  | 4-2 |  |  | 4.9 | 1.23 |  |  |  |  | 6.1 | absent |  |  |
|  | 4-3 |  |  | 6.0 | 1.50 |  |  |  |  | 5.8 | absent |  |  |
| 5 | 5-1 | C | 4.0 | 4.0 | 1.00 | 7.0 | 320 | 120 | 0.38 | 6.5 | absent | C | Example |
|  | 5-2 |  |  | 6.2 | 1.55 |  |  |  |  | 5.8 | absent |  |  |
|  | 5-3 |  |  | 7.6 | 1.90 |  |  |  |  | 5.3 | absent |  |  |
| 6 | 6-1 | A | 3.5 | 3.5 | 1.00 | — | 320 | — | — | 6.4 | absent | F | Comparative example |
|  | 6-2 |  |  |  | 1.00 |  |  |  |  | 6.5 | absent |  |  |
|  | 6-3 |  |  |  | 1.00 |  |  |  |  | 4.8 | present |  |  |

| No. | Sheet combination No. | Set electrode force (kN) | Current value (kA) | Welding time (ms) | Disturbance state | Current passage method | Change of electrode force | $R_0$ (µΩ) | $R_A$ (µΩ) | $(R_A-R_0)/R_0$ | Appropriate range of $F_A/F_0$ according to formula (1)~(3)* | Remarks |
|---|---|---|---|---|---|---|---|---|---|---|---|---|
| 7 | 7-1 | A | — |  |  | absent | constant current control | absent | — | — | — | — | Comparative example |
|  | 7-2 |  |  |  |  | existing weld (L = 20 mm) |  |  |  |  |  |  |  |
|  | 7-3 |  |  |  |  | existing weld (L = 10 mm) |  |  |  |  |  |  |  |
| 8 | 8-1 | B | 5.0 | 7.5 | 400 | absent | adaptive control | absent | — | — | — | — | Comparative example |
|  | 8-2 |  |  |  |  | existing weld (L = 20 mm) |  |  |  |  |  |  |  |
|  | 8-3 |  |  |  |  | existing weld (L = 10 mm) |  |  |  |  |  |  |  |
| 9 | 9-1 | C | 4.0 | 7.0 | 320 | absent | adaptive control | absent | — | — | — | — | Comparative example |
|  | 9-2 |  |  |  |  | sheet gap (tg = 1 mm) |  |  |  |  |  |  |  |
|  | 9-3 |  |  |  |  | sheet gap (tg = 2 mm) |  |  |  |  |  |  |  |
| 10 | 10-1 | D | 3.0 | 8.7 | 360 | absent | adaptive control | present | 140 | 141 | 0.01 | 0.9~1.1 formula (1) | Example |
|  | 10-2 |  |  |  |  | alloying of electrode with Zn |  |  |  | 156 | 0.11 | 0.43~1.00 formula (3) |  |
| 11 | 11-1 | A | 3.5 | 9.0 | 320 | absent | adaptive control | present | 150 | 150 | 0.00 | 0.9~1.1 formula (1) | Comparative example |
|  | 11-2 |  |  |  |  | existing weld (L = 20 mm) |  |  |  | 132 | −0.12 | 1.00~1.60 formula (2) |  |
|  | 11-3 |  |  |  |  | existing weld (L = 10 mm) |  |  |  | 115 | −0.23 | 1.00~2.17 formula (2) |  |
| 12 | 12-1 | E | 4.5 | 7.7 | 400 | absent | adaptive control | present | 210 | 211 | 0.00 | 0.9~1.1 formula (1) | Example |
|  | 12-2 |  |  |  |  | sheet gap (tg = 1 mm) |  |  |  | 198 | −0.06 | 0.9~1.1 formula (1) |  |
|  | 12-3 |  |  |  |  | sheet gap (tg = 2 mm) |  |  |  | 186 | −0.11 | 1.00~1.57 formula (2) |  |

| No. | Sheet combination No. | Initial set electrode force $F_0$ (kN) | Electrode force $F_A$ after $T_a$ (kN) | $F_A/F_0$ | Current value (kA) | Welding time $T_m$ (ms) | Intermediate welding time $T_a$ (ms) | $T_a/T_m$ | Nugget diameter (mm) | Expulsion | Evaluation | Remarks |
|---|---|---|---|---|---|---|---|---|---|---|---|---|
| 7 | 7-1 | A | 3.5 | 3.5 | 1.00 | 9.0 | 320 | — | — | 6.4 | absent | F | Comparative example |
|  | 7-2 |  |  |  | 1.00 |  |  |  |  | 5.9 | absent |  |  |
|  | 7-3 |  |  |  | 1.00 |  |  |  |  | 4.5 | absent |  |  |

TABLE 2-continued

| 8 | 8-1 | B | 5.0 | 5.0 | 1.00 | — | 400 | — | — | 4.4 | absent | F | Comparative example |
|   | 8-2 |   |     |     | 1.00 |   |     |   |   | 4.3 | absent |   |  |
|   | 8-3 |   |     |     | 1.00 |   |     |   |   | *2.2* | *present* |   |  |
| 9 | 9-1 | C | 4.0 | 4.0 | 1.00 | — | 320 | — | — | 6.5 | absent | F | Comparative example |
|   | 9-2 |   |     |     | 1.00 |   |     |   |   | 6.7 | absent |   |  |
|   | 9-3 |   |     |     | 1.00 |   |     |   |   | 5.7 | *present* |   |  |
| 10 | 10-1 | D | 3.0 | 3.1 | 1.03 | — | 340 | 80 | 0.24 | 6.5 | absent | A | Example |
|    | 10-2 |   |     | 2.5 | 0.83 |   |     |    |      | 6.4 | absent |   |  |
| 11 | 11-1 | A | 3.5 | 3.5 | 1.00 | — | 320 | 260 | _0.81_ | 6.4 | absent | F | Comparative example |
|    | 11-2 |   |     | 3.9 | 1.11 |   |     |     |      | 6.4 | absent |   |  |
|    | 11-3 |   |     | 4.2 | 1.20 |   |     |     |      | *4.9* | *present* |   |  |
| 12 | 12-1 | E | 4.5 | 4.6 | 1.02 | — | 400 | 150 | 0.38 | 4.2 | absent | A | Example |
|    | 12-2 |   |     | 4.8 | 1.07 |   |     |     |      | 4.4 | absent |   |  |
|    | 12-3 |   |     | 5.3 | 1.18 |   |     |     |      | 4.3 | absent |   |  |

*The ranges according to formulas (2) and (3) do not include the upper limits and the lower limits.

In all of the examples, regardless of a disturbance, nugget diameters of sufficient size were obtained without expulsion.

On the other hand, in the comparative examples, depending on a disturbance, a sufficient nugget diameter could not be obtained or expulsion occurred.

The same results were obtained when the electrode force $F_A$ of the main current passage after the intermediate welding time $T_a$ was set based on the time integration value of the resistance between the electrodes from the start of the main current passage to the intermediate welding time $T_a$.

REFERENCE SIGNS LIST 11, 12, 13 Metal sheet
14 Electrode
15 Spacer
16 Existing weld

The invention claimed is:

1. A resistance spot welding method of squeezing, by a pair of electrodes, parts to be welded that are a plurality of overlapping metal sheets, and passing a current while applying an electrode force to join the parts to be welded, the resistance spot welding method comprising:
setting an electrode force $F_A$ of main current passage after an intermediate welding time $T_a$ so as to satisfy the following formulas (1) to (3):
in the case of $-0.1 < (R_A - R_0)/R_0 \leq 0.1$ $$0.9 \times F_0 \leq F_A \leq 1.1 \times F_0 \quad (1)$$

in the case of $(R_A - R_0)/R_0 < -0.1$ $$F_0 < F_A < F_0 \times (1 - 5.0 \times (R_A - R_0)/R_0) \quad (2)$$

in the case of $0.1 < (R_A - R_0)/R_0$ $$F_0 \times (1 - 5.0 \times (R_A - R_0)/R_0) < F_A < F_0 \quad (3)$$

where
$F_0$ is an initial set electrode force in the main current passage,
$R_A$ is the average value or time integration value of the resistance between the electrodes from the start of the main current passage to the intermediate welding time $T_a$, and
$R_0$ is an average value or time integration value of a resistance between the electrodes from the start of current passage to the intermediate welding time $T_a$ that is obtained in the case where current is passed under the same conditions as the main current passage in a state of no disturbance in the parts to be welded,
wherein the intermediate welding time $T_a$ satisfies the following formula:

$$0.1 \times T_m \leq T_a \leq 0.8 \times T_m$$

where
$T_m$ is a total welding time of the main current passage, and
wherein the resistance spot welding method comprises actual welding in which the main current passage is performed and test welding prior to the actual welding,
in main current passage in the test welding, a time variation curve of an instantaneous amount of heat generated per unit volume and a cumulative amount of heat generated per unit volume that are calculated from an electrical property between the electrodes in forming an appropriate nugget by performing current passage by constant current control, and a time integration value of a resistance between the electrodes are stored, and
further, in the main current passage in the actual welding, the time variation curve of the instantaneous amount of heat generated per unit volume and the cumulative amount of heat generated per unit volume in the main current passage in the test welding are set as target values, and adaptive control welding is performed to control a current passage amount according to the target values.

2. A weld member production method comprising joining a plurality of overlapping metal sheets by the resistance spot welding method according to claim 1.

* * * * *